United States Patent
Heikal et al.

(10) Patent No.: US 11,769,409 B2
(45) Date of Patent: Sep. 26, 2023

(54) AUTOMATED PARKING LOT DIGITAL MAP GENERATION AND USE THEREOF

(71) Applicant: Charter Communications Operating, LLC, St. Louis, MO (US)

(72) Inventors: Hany A. Heikal, Aurora, CO (US); Hossam H. Hmimy, Aurora, CO (US); Mohamed Daoud, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 79 days.

(21) Appl. No.: 17/122,367

(22) Filed: Dec. 15, 2020

(65) Prior Publication Data

US 2022/0189305 A1 Jun. 16, 2022

(51) Int. Cl.

| G08G 1/14 | (2006.01) |
|---|---|
| G06T 7/70 | (2017.01) |
| H04N 23/90 | (2023.01) |
| H04W 4/021 | (2018.01) |
| G01C 21/36 | (2006.01) |
| H04N 5/265 | (2006.01) |
| H04N 5/272 | (2006.01) |
| G06T 11/20 | (2006.01) |
| G08G 1/16 | (2006.01) |
| G07B 15/00 | (2011.01) |
| G06V 20/52 | (2022.01) |
| G06V 20/62 | (2022.01) |

(52) U.S. Cl.
CPC ........... *G08G 1/143* (2013.01); *G01C 21/367* (2013.01); *G06T 7/70* (2017.01); *G06T 11/203* (2013.01); *G06V 20/52* (2022.01); *G07B 15/00* (2013.01); *G08G 1/142* (2013.01); *G08G 1/168* (2013.01); *H04N 5/265* (2013.01); *H04N 5/272* (2013.01); *H04N 23/90* (2023.01); *H04W 4/021* (2013.01); *G06Q 2240/00* (2013.01); *G06T 2207/20221* (2013.01); *G06T 2207/30244* (2013.01); *G06V 20/625* (2022.01)

(58) Field of Classification Search
None
See application file for complete search history.

(56) References Cited

U.S. PATENT DOCUMENTS

| 9,547,796 B2 * | 1/2017 | Fukuda .............. G08G 1/09626 |
| 9,557,741 B1 * | 1/2017 | Elie ........................... G06T 7/73 |
| 10,311,731 B1 * | 6/2019 | Li .......................... G08G 1/0129 |
| 11,183,064 B2 * | 11/2021 | Isgar ...................... G08G 1/143 |
| 2001/0017591 A1 * | 8/2001 | Kuriya ............... B62D 15/0275 340/436 |

(Continued)

OTHER PUBLICATIONS

Rashid, M. M., et al., "Automatic Parking Management System and Parking Fee Collection Based on Number Plate Recognition," https://pdfs.semanticscholar.org/f29d/0b93f158d97ad108fb761e126a6b56c78a46.pdf, International Journal of Machine Learning and Computing, vol. 2, No. 2, Apr. 2012, 6 pages.

(Continued)

*Primary Examiner* — David H Chu
(74) *Attorney, Agent, or Firm* — Dority & Manning, P.A.

(57) ABSTRACT

Automated parking lot digital map generation and use thereof is disclosed. Imagery of a parking lot is received from a video camera, the imagery depicting lines that define a plurality of parking spots. A parking lot digital map comprising data that defines a location and dimensions of each parking spot is generated. The parking lot digital map is stored in a memory.

17 Claims, 8 Drawing Sheets

(56) References Cited

U.S. PATENT DOCUMENTS

| | | | |
|---|---|---|---|
| 2015/0081212 A1* | 3/2015 | Mitchell | H04W 4/022 |
| | | | 701/454 |
| 2016/0284217 A1* | 9/2016 | Lee | B60D 1/30 |
| 2018/0082588 A1* | 3/2018 | Hoffman, Jr. | G08G 1/166 |
| 2018/0095474 A1* | 4/2018 | Batur | G01S 13/867 |
| 2018/0099661 A1* | 4/2018 | Bae | B62D 15/0285 |
| 2018/0218582 A1* | 8/2018 | Hodge | H04N 21/2181 |
| 2018/0253108 A1* | 9/2018 | Heinla | G06T 7/73 |
| 2018/0334189 A1* | 11/2018 | Benmimoun | B62D 15/0285 |
| 2019/0049977 A1* | 2/2019 | Dean | G05D 1/0225 |
| 2019/0375409 A1* | 12/2019 | Hunt | G01C 21/36 |
| 2020/0017099 A1* | 1/2020 | Yamaguchi | G08G 1/168 |
| 2020/0062242 A1* | 2/2020 | Hayakawa | G08G 1/168 |
| 2020/0108824 A1* | 4/2020 | Bettger | G01S 19/13 |
| 2020/0211400 A1* | 7/2020 | Cho | G05D 1/0088 |
| 2020/0219390 A1* | 7/2020 | Lyles | G06V 20/52 |
| 2020/0262417 A1* | 8/2020 | Hüger | B60W 30/06 |
| 2020/0353914 A1* | 11/2020 | Hasejima | B60W 40/105 |
| 2021/0056848 A1* | 2/2021 | Tsuge | G06V 20/58 |
| 2021/0233408 A1* | 7/2021 | Swan | G08G 1/04 |
| 2021/0370916 A1* | 12/2021 | Ishinoda | B60W 30/06 |
| 2022/0303719 A1* | 9/2022 | Makkiya | H04W 4/40 |

OTHER PUBLICATIONS

Walker, Alissa, "This New Parking App Can Find Empty Spaces, No Sensors Required," https://gizmodo.com/this-new-parking-app-can-find-empty-spaces-nosensors-1635449274, Sep. 16, 2014, 5 pages.

* cited by examiner

AUTOMATED PARKING LOT DIGITAL MAP GENERATION AND USE THEREOF

BACKGROUND

Parking a vehicle is sometimes more problematic than it should be. During inclement weather, it can be difficult or impossible to know where the lines of a parking spot are, causing inefficient parking that utilizes more parking spots than necessary and causing inconvenience for those who otherwise would have been able to park in the parking lot, as well as a potential loss of revenue for a parking lot operator. A parking lot may be substantially full, and an individual may spend a substantial amount of time driving around the parking lot looking for an open parking spot, wasting gas and time, and increasing a risk of a collision between the vehicle and another vehicle, or between the vehicle and a pedestrian. Even in clear weather, an individual can inadvertently park poorly, such that their vehicle is encroaching on an adjacent parking spot.

SUMMARY

The embodiments relate to automated parking lot digital map generation and use thereof.

In one embodiment a method is disclosed. The method includes receiving, by a computing device from a video camera, imagery of a parking lot, the imagery depicting lines that define a plurality of parking spots. The method further includes generating, by the computing device based on the imagery, a parking lot digital map comprising data that defines a location and dimensions of each parking spot. The method further includes storing the parking lot digital map in a memory.

In another embodiment a system is disclosed. The system includes one or more computing devices, each computing device comprising one or more processors. The one or more processors are configured to receive, from a video camera, imagery of a parking lot, the imagery depicting lines that define a plurality of parking spots. The one or more processors are further configured to generate, based on the imagery, a parking lot digital map comprising data that defines a location and dimensions of each parking spot. The one or more processors are further configured to store the parking lot digital map in a memory.

In another embodiment a non-transitory computer-readable storage medium is disclosed. The non-transitory computer-readable storage medium includes executable instructions to cause one or more processor devices to receive, from a video camera, imagery of a parking lot, the imagery depicting lines that define a plurality of parking spots. The executable instructions further cause the one or more processor devices to generate, based on the imagery, a parking lot digital map comprising data that defines a location and dimensions of each parking spot. The executable instructions further cause the one or more processor devices to store the parking lot digital map in a memory.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Parking a vehicle is sometimes more problematic than it should be. During inclement weather, it can be difficult or impossible to know where the lines of a parking spot are, causing inefficient parking that utilizes more parking spots than necessary and causing inconvenience for those who otherwise would have been able to park in the parking lot, as well as a potential loss of revenue for a parking lot operator. A parking lot may be substantially full, and an individual may spend a substantial amount of time driving around the parking lot looking for an open parking spot, wasting gas and time, and increasing a risk of a collision between the vehicle and another vehicle, or between the vehicle and a pedestrian. Even in clear weather, an individual can inadvertently park poorly, such that their vehicle is encroaching on an adjacent parking spot.

Figure 1:
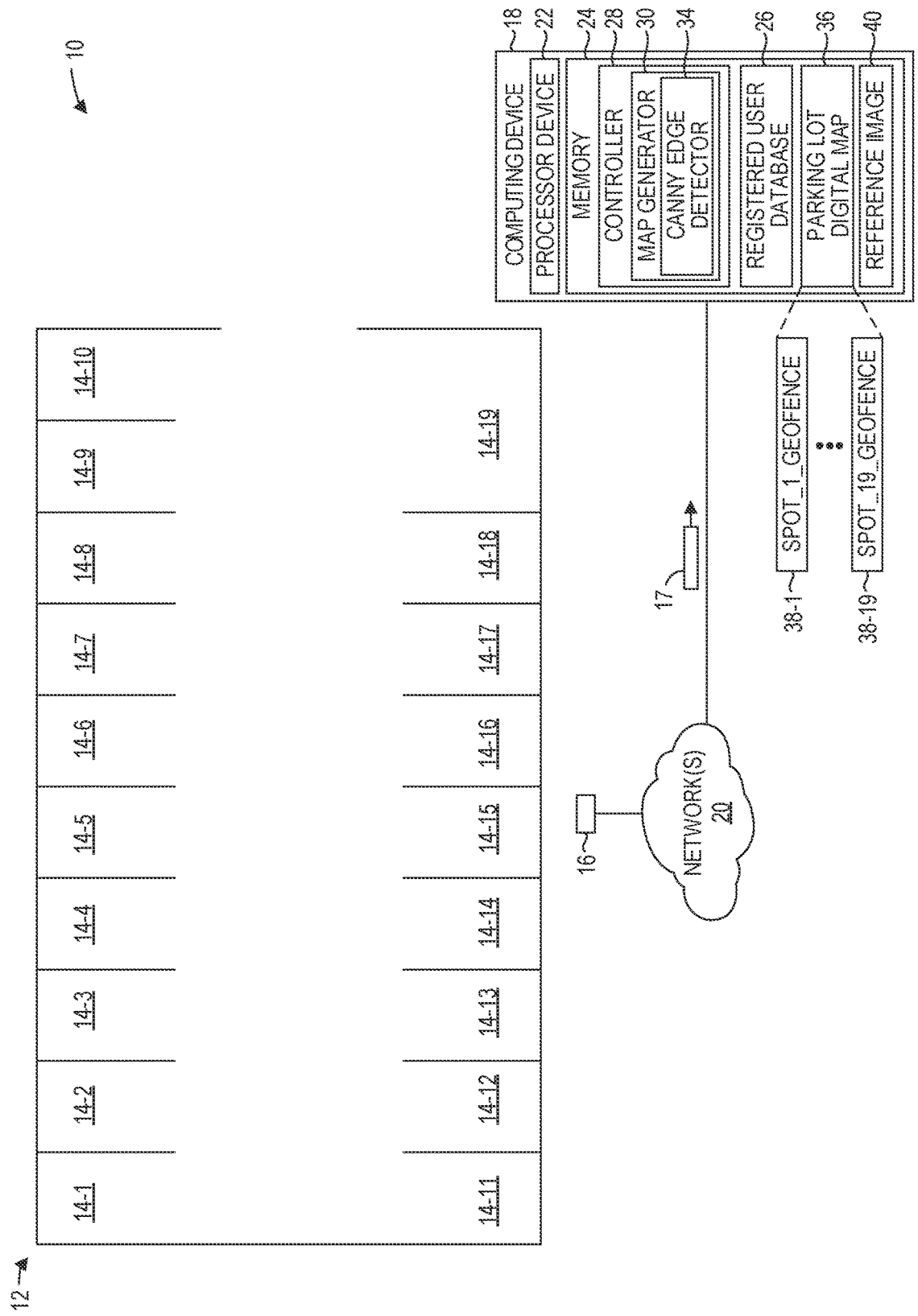
FIG. 1 is a diagram of an environment in which automated parking lot digital map generation and use thereof may be practiced according to one embodiment.

The embodiments disclosed herein implement a number of assisted parking features utilizing real-time video analysis and, in some instances, real-time feedback to an operator of a vehicle. FIG. 1 is a block diagram of an environment 10 in which automated parking lot digital map generation and use thereof may be practiced according to one embodiment. The environment 10 includes a parking lot 12. The parking lot 12 comprises a plurality of parking spots 14-1-14-19 (generally, parking spots 14). While the parking lot 12 has a rectangular shape, the embodiments have applicability to any size and shape of parking lot, as well as to parking structures with multiple floors of parking lots. The environment 10 includes at least one video camera 16. The video camera 16 is positioned such that the entire parking lot 12 is within a field of view of the video camera 16-1. In some implementations, the video camera 16 may be positioned on a structure, such as a pole, a wall, a roof, or some other fixed surface. It is noted that, while solely for purposes of illustration the parking spots 14 are perpendicular, the embodiments disclosed herein are applicable to any type of parking spots, including, by way of non-limiting example, parallel and angled parking spots.

The video camera 16 continuously provides imagery of the parking lot 12, in the form of a video stream 17, to a computing device 18. While for purposes of illustration and simplicity, the embodiments will be described as being implemented by the single computing device 18, it is understood that, in practice, the functionality described herein may be implemented by any number of processes executing on any number of different processor devices associated with any number of different computing devices. Such computing devices may be communicatively coupled to one another, and to the video camera 16 via one or more networks 20. One or more of such computing devices may be physically near the video camera 16, may be geographically remote from the video camera 16, and/or may be located in a cloud computing environment. The one or more networks 20 may comprise any one or a combination of wired, wireless, Wi-Fi®, and cellular networks.

The computing device 18 includes a processor device 22 and a memory 24. In some embodiments, the memory 24 may include a registered user database 26 that includes information about registered users of the parking lot 12, such as one or more license plates that correspond to the registered user, contact information for the registered user, billing information for the registered user, and the like.

A controller 28 receives the video stream 17. A map generator 30 extracts one or more images from the video stream 17 and analyzes the one or more images to generate a parking lot digital map 36 that comprises data that defines a location and dimensions of each parking spot 14. The parking lot digital map 36 may be stored in the memory 24 and/or other locations, such as a persistent memory, such as on a hard drive or the like.

The analysis of the images to identify the plurality of parking spots 14 may be done in any suitable manner. In some embodiments, the map generator 30 utilizes a Canny edge detector 34 to identify the lines in the images that define the parking spots 14. Based on the lines detected by the Canny edge detector 34, the map generator 30 generates the parking lot digital map 36 that includes a plurality of geofence structures 38-1-38-19 (generally, geofence structures 38), each of which corresponds to a parking spot 14-1-14-19. Each geofence structure 38 identifies the dimensions and location of the corresponding parking spot 14. The geofence structure 38 may identify the dimensions of the corresponding parking spot 14 via, for instance, X and Y coordinates that define a polygon that matches the exact size of the corresponding parking spot 14.

The parking lot digital map 36 may also include a reference location for each geofence structure 38 with respect to the imagery contained in the video stream 17 such that the polygon defined by each geofence structure 38 aligns with the corresponding parking spot 14 in the video stream 17. In some embodiments, the parking lot digital map 36 may include information that identifies a desired parking area within each parking spot 14. The desired parking area may comprise, for example, an offset value, such as 8 inches, that can be applied to each polygon to help ensure a vehicle is substantially centered in a parking spot 14. In other embodiments, the desired parking area may be identical to the parking spot 14.

In some implementations, the parking lot 12 may be substantially larger than 19 parking spots and/or may be irregularly shaped, such that multiple video cameras 16 are positioned at different locations about the parking lot 12 to cover the entire parking lot 12. Each of the video cameras 16 may generate video streams comprising images of different portions of the parking lot 12. In such implementations, the controller 28 may first extract one or more images from each of the video cameras 16 and stich together, or otherwise merge, the plurality of images to generate a merged image that depicts the entire parking lot 12. The controller 28 may then generate the parking lot digital map 36 from the merged image.

The controller 28 may store the image, or merged image, from which the parking lot digital map 36 is generated as a reference image 40. Periodically, intermittently, or in response to the occurrence of some event, the controller 28 may extract one or more images from the video stream 17 and compare the one or more images to the reference image 40 to determine if the orientation of the video camera 16 differs from the orientation of the video camera 16 when the parking lot digital map 36 was generated. The orientation of the video camera 16 may differ, for example, because of wind, an impact by some vehicle or other object, or other reasons. If the controller 28 determines that the orientation of the video camera 16 differs from the orientation of the video camera 16 when the parking lot digital map 36 was generated, the controller 28 may generate a new parking lot digital map 36 based on the new imagery, and replace the original parking lot digital map 36 with the new parking lot digital map 36.

In some embodiments, the video camera 16 may include or be coupled to a wind sensor that provides wind speeds to the controller 28, and the controller 28 may utilize such information to compare the current orientation of the video camera 16 to the previous orientation of the video camera 16. In some embodiments, the video camera 16 may periodically access weather information to utilize to make such determinations. In some embodiments, operator input may cause the video camera 16 to generate a new parking lot digital map 36.

It is noted that, because the controller 28 is a component of the computing device 18, functionality implemented by the controller 28 may be attributed to the computing device 18 generally. Moreover, in examples where the controller 28 comprises software instructions that program the processor device 22 to carry out functionality discussed herein, functionality implemented by the controller 28 may be attributed herein to the processor device 22.

Figure 2:
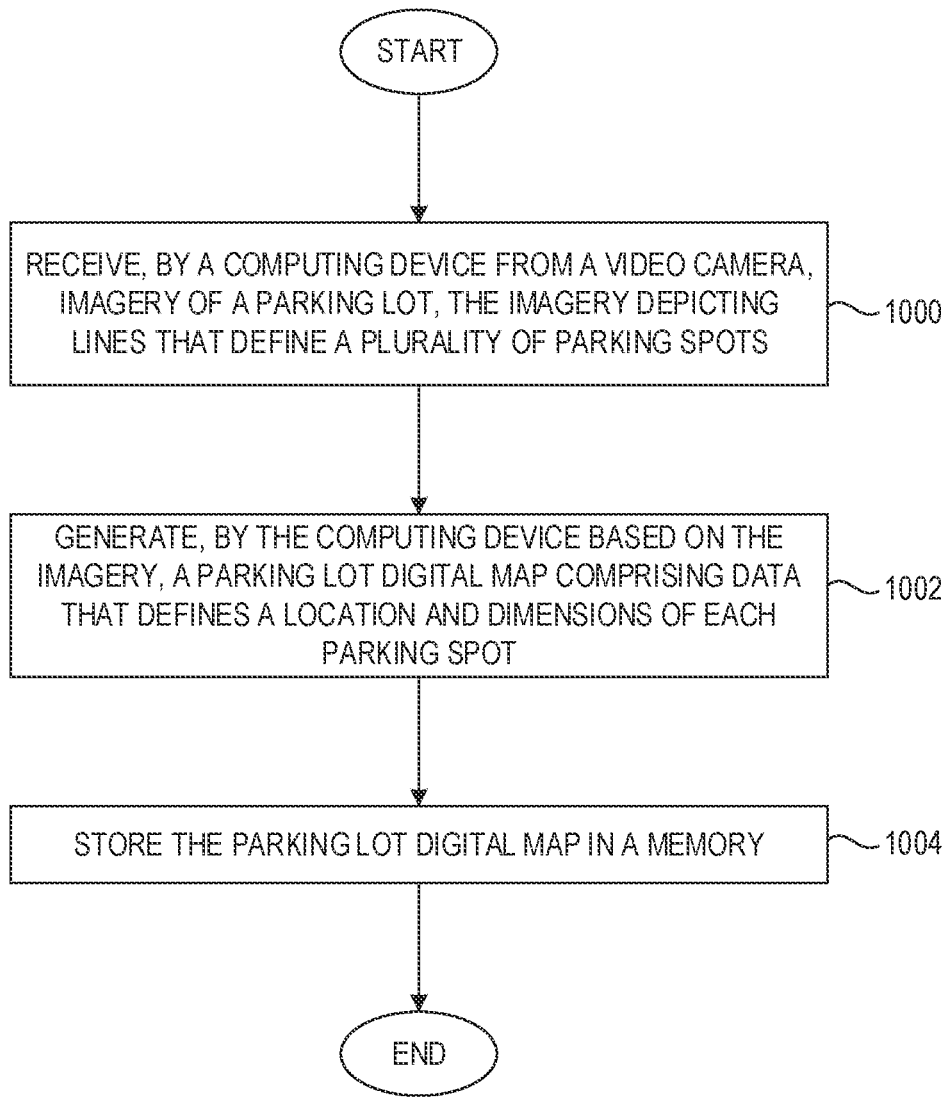
FIG. 2 is a flowchart of a method for automated parking lot digital map generation according to one embodiment.

FIG. 2 is a method for automated parking lot digital map generation according to one embodiment. FIG. 2 will be discussed in conjunction with FIG. 1. The computing device 18 receives, from the video camera 16, imagery of the parking lot 12, the imagery depicting lines that define the plurality of parking spots 14 (FIG. 2, block 1000). The computing device 18 generates, based on the imagery, the parking lot digital map 36 comprising data that defines a location and dimensions of each parking spot 14 (FIG. 2, block 1002). The computing device 18 stores the parking lot digital map 36 in the memory 24 (FIG. 2, block 1006).

Figure 3A:
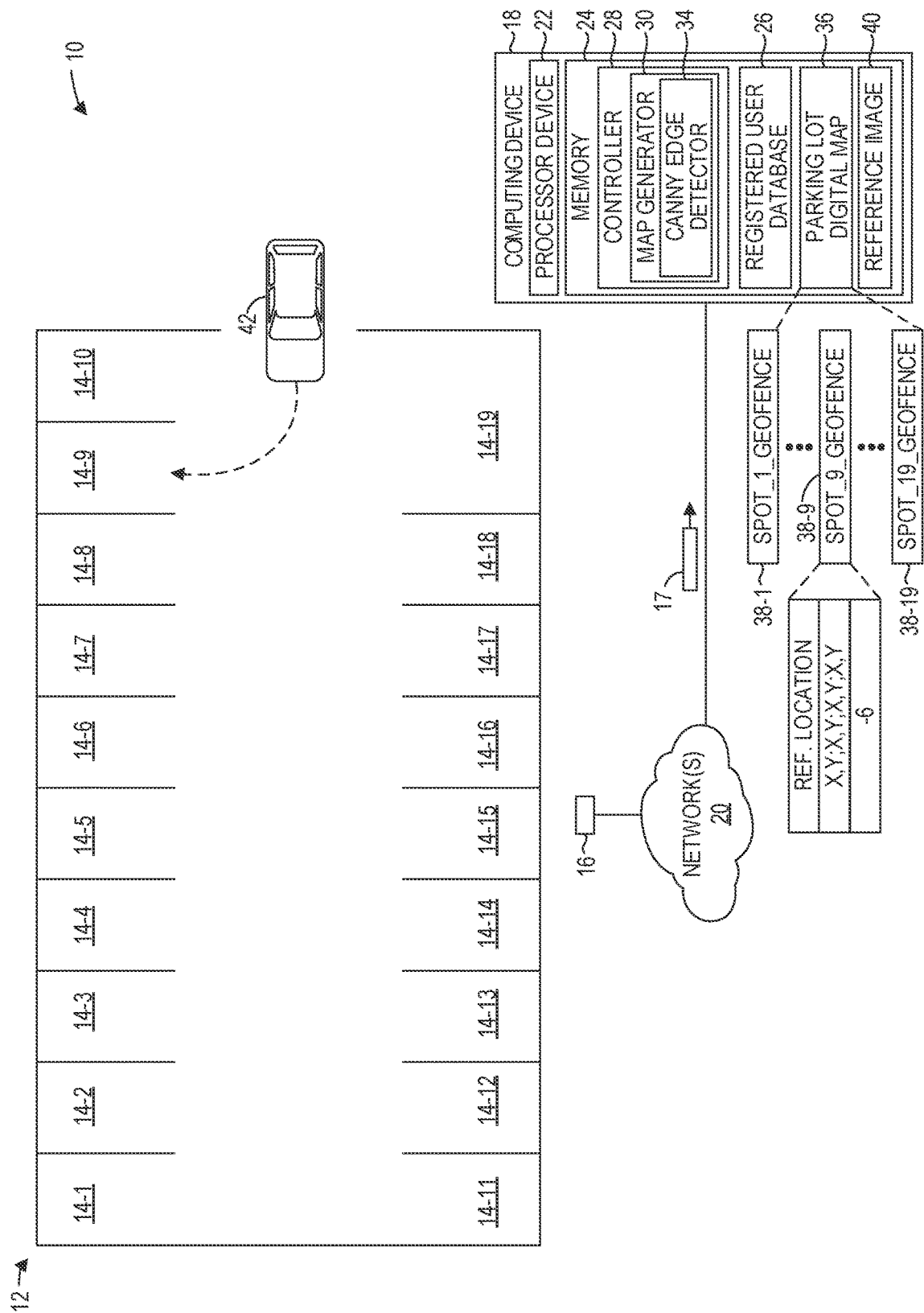
FIGS. 3A-3B are diagrams that illustrate automated parking lot digital map generation and use of a visual indicator in the environment illustrated in FIG. 1, to indicate to a driver of a vehicle whether the vehicle is properly positioned within a parking spot, according to one embodiment.
Figure 3B:
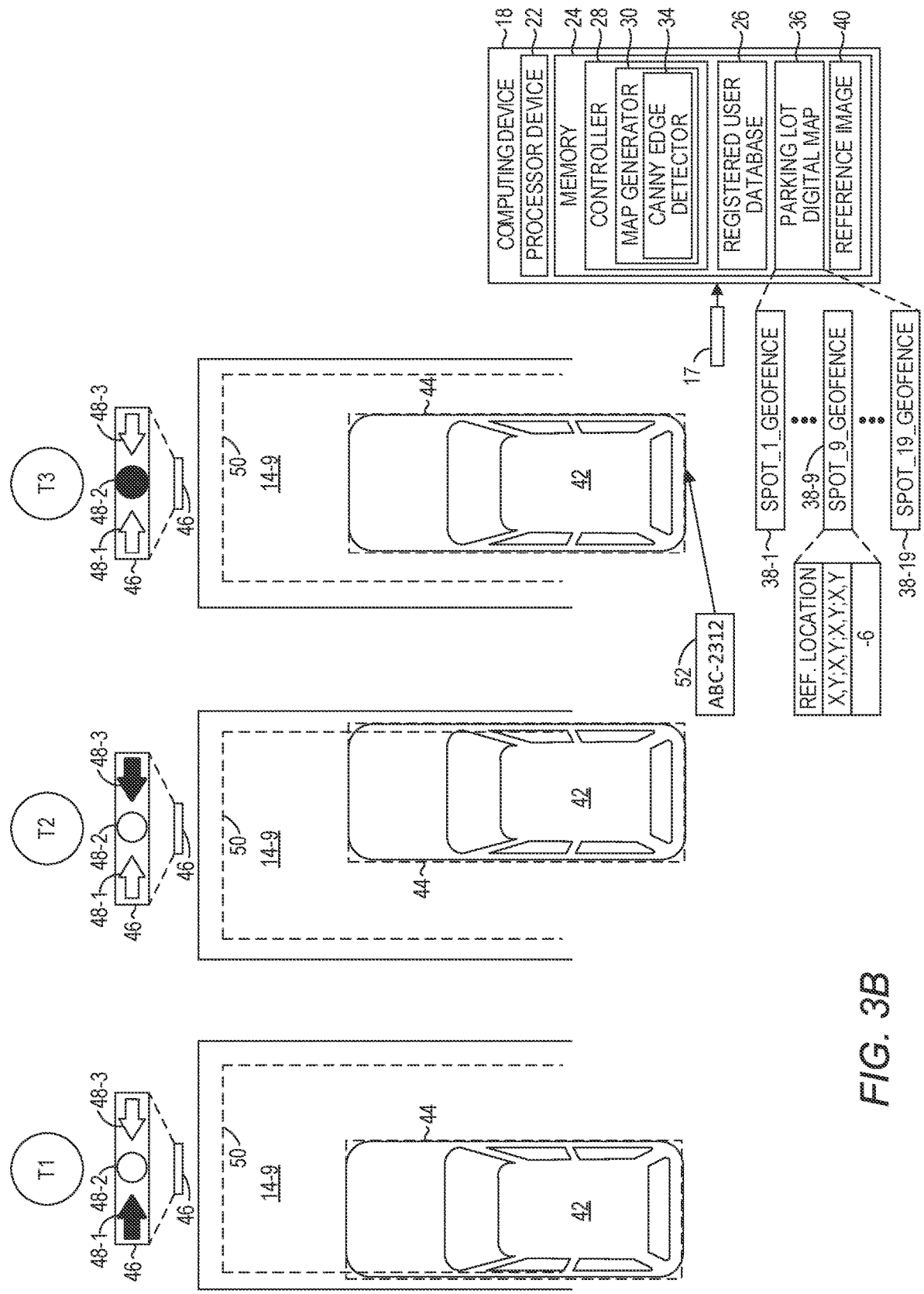

FIGS. 3A-3B illustrate the automated parking lot digital map generation and use thereof according to another embodiment. Referring first to FIG. 3A, a vehicle 42 enters the parking lot 12 and begins to park in the parking spot 14-9. The controller 28 continuously analyzes the video stream 17 to detect events, such as the entry or departure of vehicles. The controller 28 detects the vehicle 42 and determines that the vehicle 42 is attempting to park in the parking spot 14-9. Referring now to FIG. 3B, an enlarged view of the parking spot 14-9 is illustrated at three different points in time, T1, T2, and T3. The controller 28 accesses the geofence structure 38-9 to identify the dimensions of the parking spot 14-9. The controller 28 may overlay the polygon defined by the geofence structure 38-9 onto the images that make up the video stream 17. In some embodiments, the controller 28 may determine a vehicle boundary box 44 that surrounds the vehicle 42. An indicator 46 that is wirelessly or otherwise communicatively coupled to the computing device 18 is positioned in front of the parking spot 14-9. The indicator 46 contains three visual indicators 48-1-48-3 that the indicator 46 can activate upon the receipt of a control signal from the computing device 18. The visual indicator 48-1 comprises an arrow pointing from left to right, the visual indicator 48-2 comprises a circle, and the visual indicator 48-3 comprises an arrow pointing from right to left.

Based on the geofence structure 38-9, the controller 28 may utilize an offset, in this example, 6 inches, to generate a desired parking area 50 whose borders are within the parking spot 14-9. In other embodiments, the desired parking area 50 may be congruent with the parking spot 14-9. At a time T1, the controller 28 compares the vehicle boundary box 44 to the desired parking area 50 and determines that the vehicle 42 is outside of the desired parking area 50. The controller 28 sends a control signal to the indicator 46 instructing the indicator 46 to emit the visual indicator 48-1. The indicator 46 turns on the visual indicator 48-1, thus indicating to a driver of the vehicle 42 that the driver should move the vehicle 42 to the right.

At a time T2, the controller 28 compares the vehicle boundary box 44 to the desired parking area 50 and determines that the vehicle 42 is outside of the desired parking area 50. The controller 28 sends a control signal to the indicator 46 instructing the indicator 46 to emit the visual indicator 48-3. The indicator 46 turns on the visual indicator 48-3, thus indicating to the driver that the driver should move the vehicle 42 to the left.

At a time T3, the controller 28 compares the vehicle boundary box 44 to the desired parking area 50 and determines that the vehicle 42 is within the desired parking area 50. The controller 28 sends a control signal to the indicator 46 instructing the indicator 46 to emit the visual indicator 48-2. The indicator 46 turns on the visual indicator 48-2, thus indicating to the driver that the driver is properly parking the vehicle 42 within the desired parking area 50.

The visual indicators 48 may comprise any suitable shape or color suitable for indicating to a driver of the vehicle 42 that the vehicle is inside or outside the desired parking area 50.

In some embodiments, individuals may register or otherwise subscribe to an automatic billing mechanism associated with the parking lot 12. The controller 28 may analyze the video stream 17 and detect a license plate number 52 of a license plate on the vehicle 42. The controller 28 accesses the registered user database 26 and determines that the license plate number 52 is associated with a registered user, and initiates a parking charge to the registered user.

Figure 4:
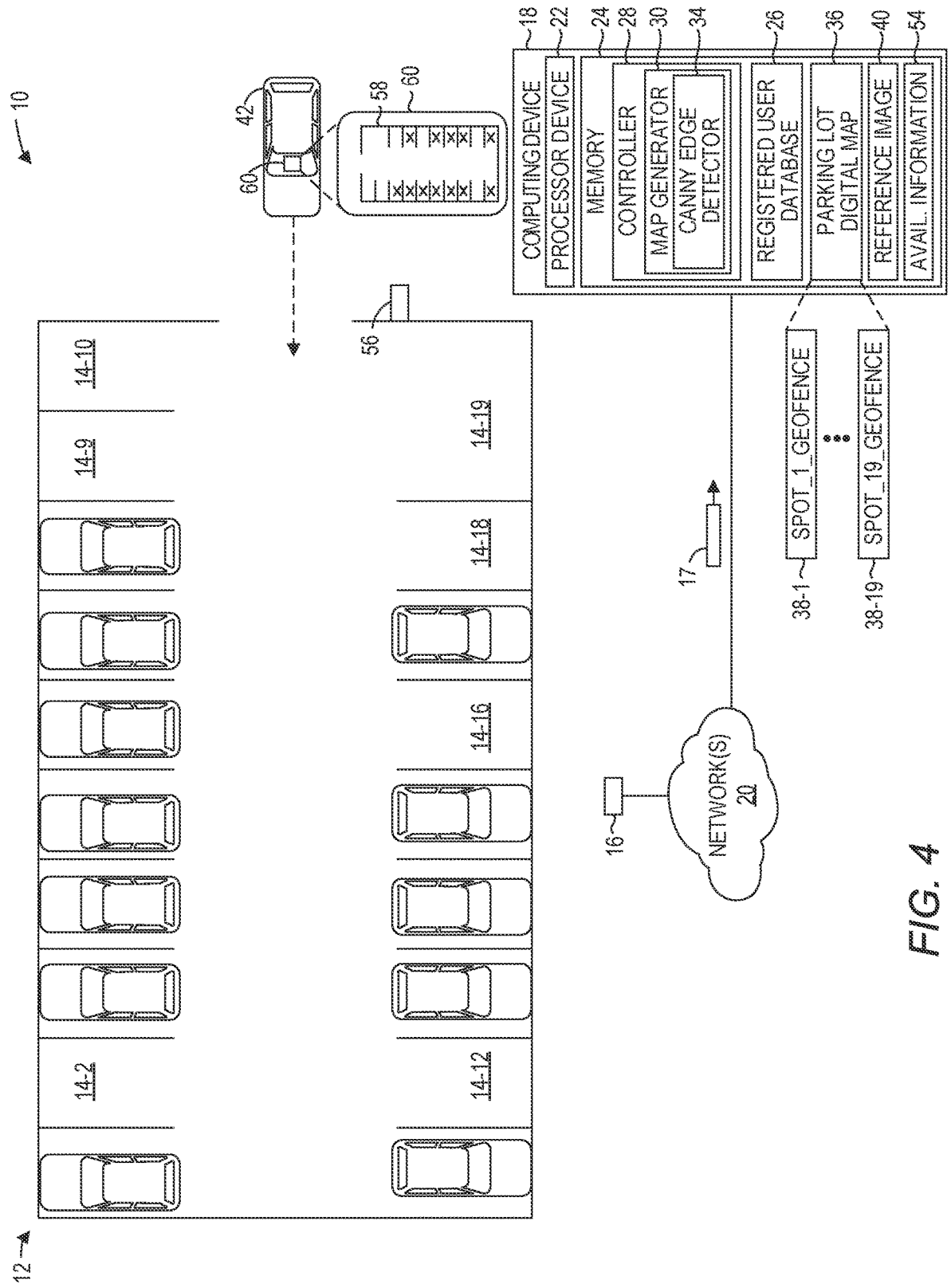
FIG. 4 is a diagram that illustrates automated parking lot digital map generation and wireless communications with a vehicle to provide the vehicle parking spot availability information, according to one embodiment.

FIG. 4 is a diagram of the environment 10 according to another embodiment. In this embodiment, the controller 28 analyzes the video stream 17 and notes which parking spots 14 are taken and which parking spots 14 are available. The controller 28 maintains and updates, upon the arrivals and departures of vehicles, availability information 54 that identifies, at any instance in time, what parking spots 14 are available. As a vehicle 42 approaches the parking lot 12, a wireless controller 56 component of the controller 28 may detect the presence of the vehicle 42, and initiate a predetermined wireless communication with the vehicle 42 to determine if the vehicle 42 is capable of receiving information from the controller 28. If the wireless controller 56 receives a wireless communication from the vehicle 42 that indicates the vehicle 42 can receive information, the controller 28 generates, based on the parking lot digital map 36 and the availability information 54, an availability map 58 that contains information that identifies a set of the parking spots 14 that are available, and causes the wireless controller 56 to send the availability map 58 to the vehicle 42. The vehicle 42 presents the availability map 58 on a display device 60 in the vehicle 42 to the driver.

In some embodiments, the controller 28 may determine, based on the video stream 17, that the vehicle 42 has parked in a manner that encroaches on two parking spots 14. In response, the controller 28 may initiate a parking charge to the registered user for both parking spots 14. In some embodiments, the controller 28 may first send a message to the vehicle 42 indicating that the vehicle 42 is encroaching on two parking spots, and thus will be invoiced for two parking spots to give the driver an opportunity to move the vehicle 42 within a single parking spot 14.

Figure 5:
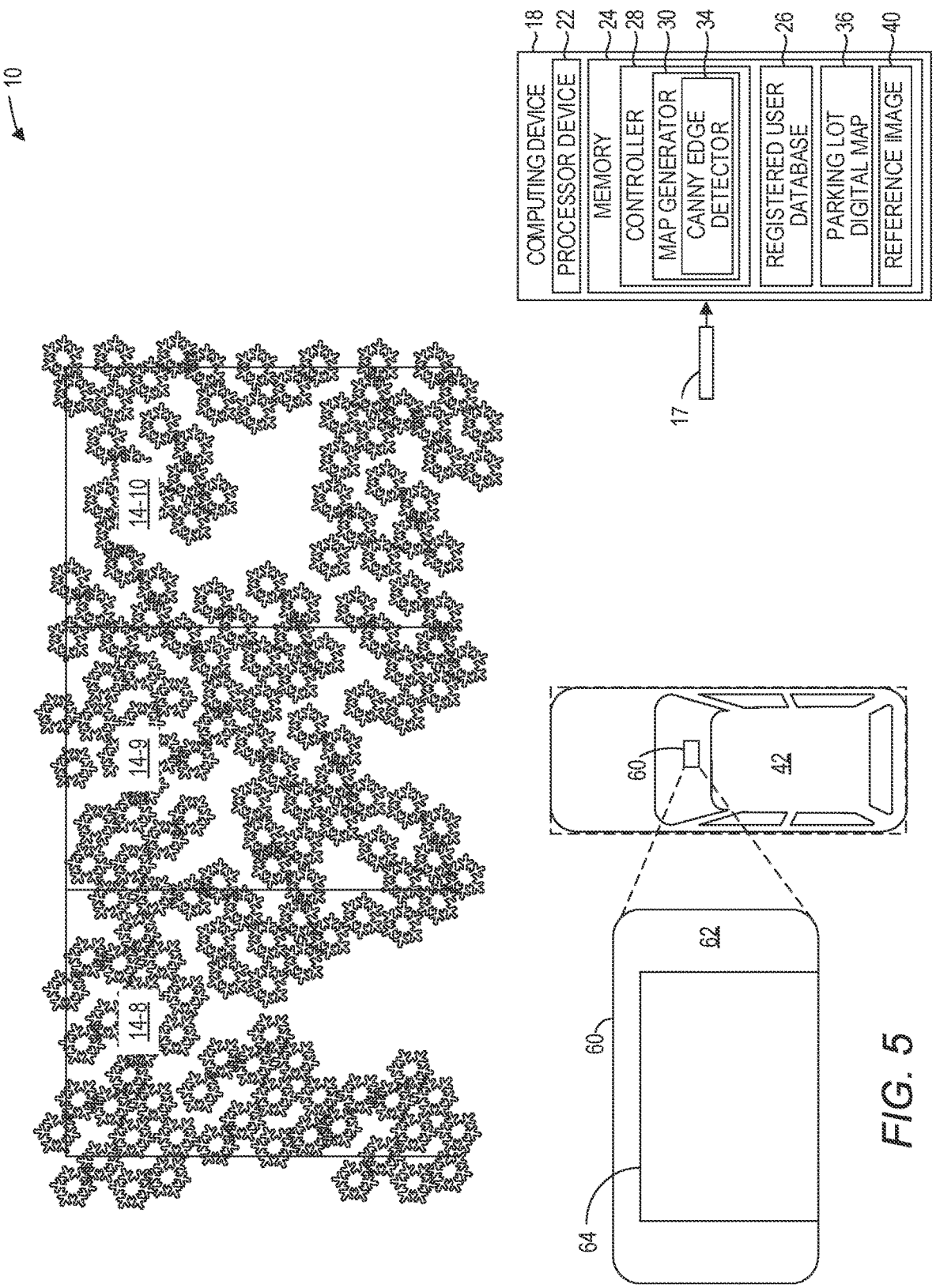
FIG. 5 is a diagram that illustrates automated parking lot digital map generation and use thereof during inclement weather, according to one embodiment.

FIG. 5 is a diagram of the environment 10 according to another embodiment during inclement weather. In this embodiment, the vehicle 42 is approaching or entering the parking lot 12 during inclement weather. A recent snowfall has covered the parking lot 12 such that the lines of the parking spots 14 are not visible to the driver. As discussed with regard to FIG. 4, the controller 28 may determine that the vehicle 42 is capable of receiving information from the controller 28. The controller 28 may communicate to the vehicle 42 the dimensions and location of the parking spots 14 based on the parking lot digital map 36. The vehicle 42 includes a forward camera that presents, on the display device 60, real-time video imagery 62 of the environment in front of the vehicle 42. The vehicle 42 receives the dimensions and location of the parking spots 14 and overlays parking spot lines 64 onto the real-time video imagery 62 presented on the display device 60, so that the driver can maneuver the vehicle 42 into the parking spot 14-9, for example, even though the driver cannot see the actual parking spot lines of the parking spot 14-9 due to the snow.

In some embodiments, the vehicle 42 may be configured to integrate the dimensions and location of the parking spots 14 with existing guidelines presented by the vehicle 42 on the display device 60 that identify the forward path of the vehicle 42 given its current location and orientation of the wheels.

The vehicle 42 can compare the existing guidelines to the dimensions and location of a particular parking spot 14 and, if the vehicle 42 is moving in a forward direction that is inconsistent with correctly parking within the parking spot 14, provide an alert to the driver.

In some embodiments, the vehicle 42 may be capable of autonomous driving. The vehicle 42 may receive information from the controller 28 that identifies the locations and dimensions of the parking spots 14, as well as the locations of available parking spots 14, and park itself into an available parking spot 14.

Figure 6:
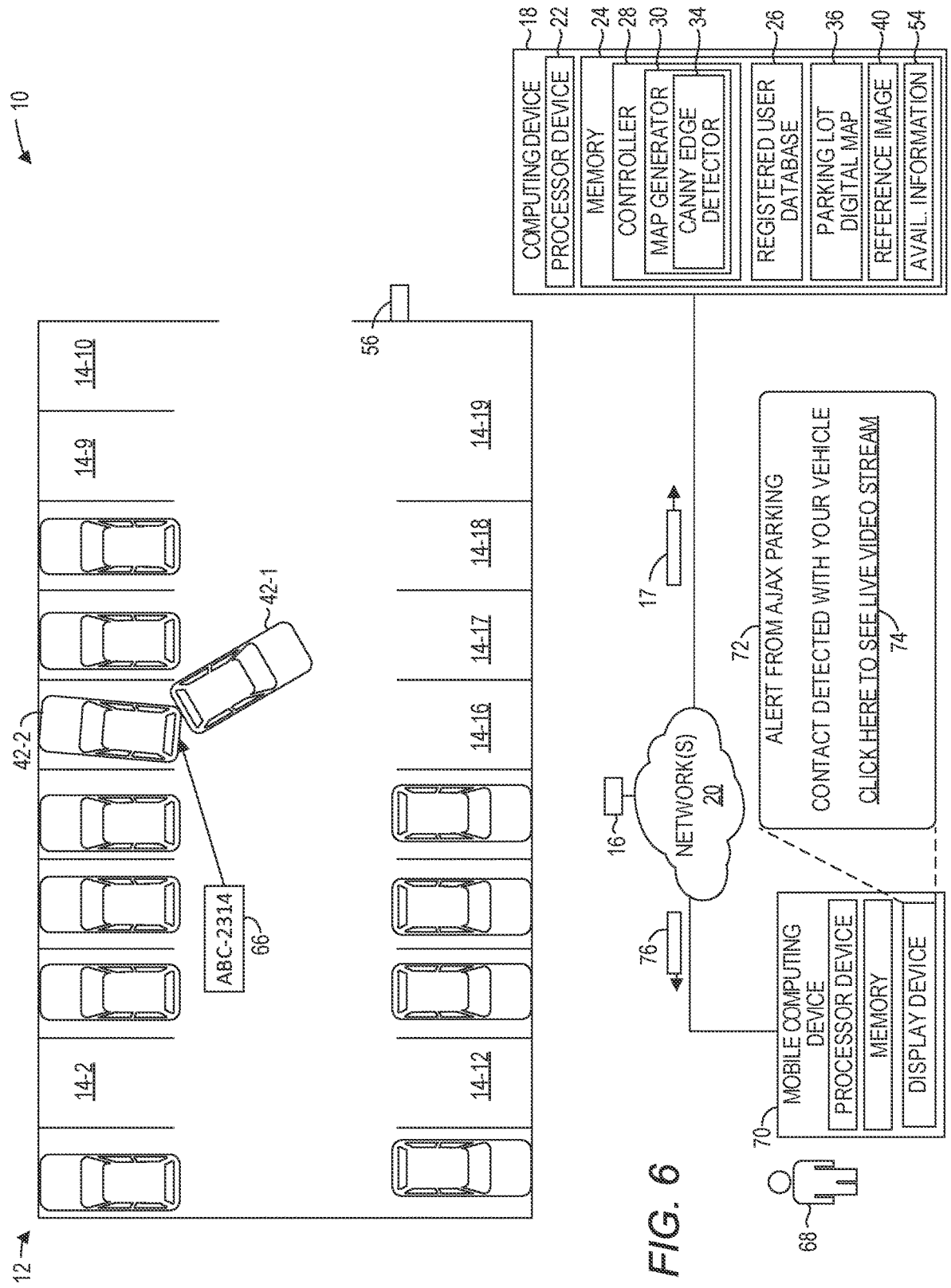
FIG. 6 is a diagram that illustrates automated parking lot digital map generation and use thereof to notify registered users of the occurrence of an event, according to one embodiment.

FIG. 6 is a diagram of the environment 10 according to yet another embodiment. In this embodiment, the controller 28 operates to notify registered users of certain events that occur. In this example, the controller 28, based on the imagery in the video stream 17, determines that a vehicle 42-1 has impacted a vehicle 42-2. The controller 28 detects a license plate number 66 of the vehicle 42-2. The controller 28 determines, based on the registered user database 26, that the license plate number 66 is associated with a registered user 68. The registered user 68 is associated with a mobile computing device 70. The controller 28 sends, to a destination address associated with the registered user 68, such as an email address or a telephone number that corresponds to the registered user 68, a message 72 identifying the event. The message may comprise, for example, an email or an SMS message.

In some embodiments, the message may include a selectable link 74 that, when selected, causes a live video stream 76 generated by the video camera 16 to be streamed to the mobile computing device 70 from which the selectable link 74 was selected.

In other embodiments, the controller 28 may continuously access weather information and, upon a determination that inclement weather is approaching, such as a hail storm, an electrical storm, or the like, determine the license plate of each vehicle 42 in the parking lot 12, access the registered user database 26 to determine which of the vehicles 42 correspond to registered users of the parking lot 12, and send messages to destination addresses associated with each of such registered users warning the registered users of the imminent inclement weather. In some embodiments, the controller 28 may include in the message an opportunity to reply to the message in a manner that authorizes an attendant to move a vehicle 42 from an uncovered parking spot to a covered parking spot.

In some embodiments, the registered user 68 may access a first uniform resource identifier (URI) that corresponds to the parking lot 12. In response, the controller 28 may generate imagery of a current state of the parking lot 12, including information that identifies which parking spots 14 are available, and provide the imagery to the mobile computing device 70 so that the registered user 68 can, from any location, determine a current status of the parking lot 12.

In some embodiments, the registered user 68 may access a second URI that corresponds to the video camera 16. In response, the controller 28 causes a video stream from the video camera 16 to be provided to the device from which the second URI was accessed, allowing the registered user 68 to view real-time imagery of the vehicle 42-2 associated with the registered user 68.

Figure 7:
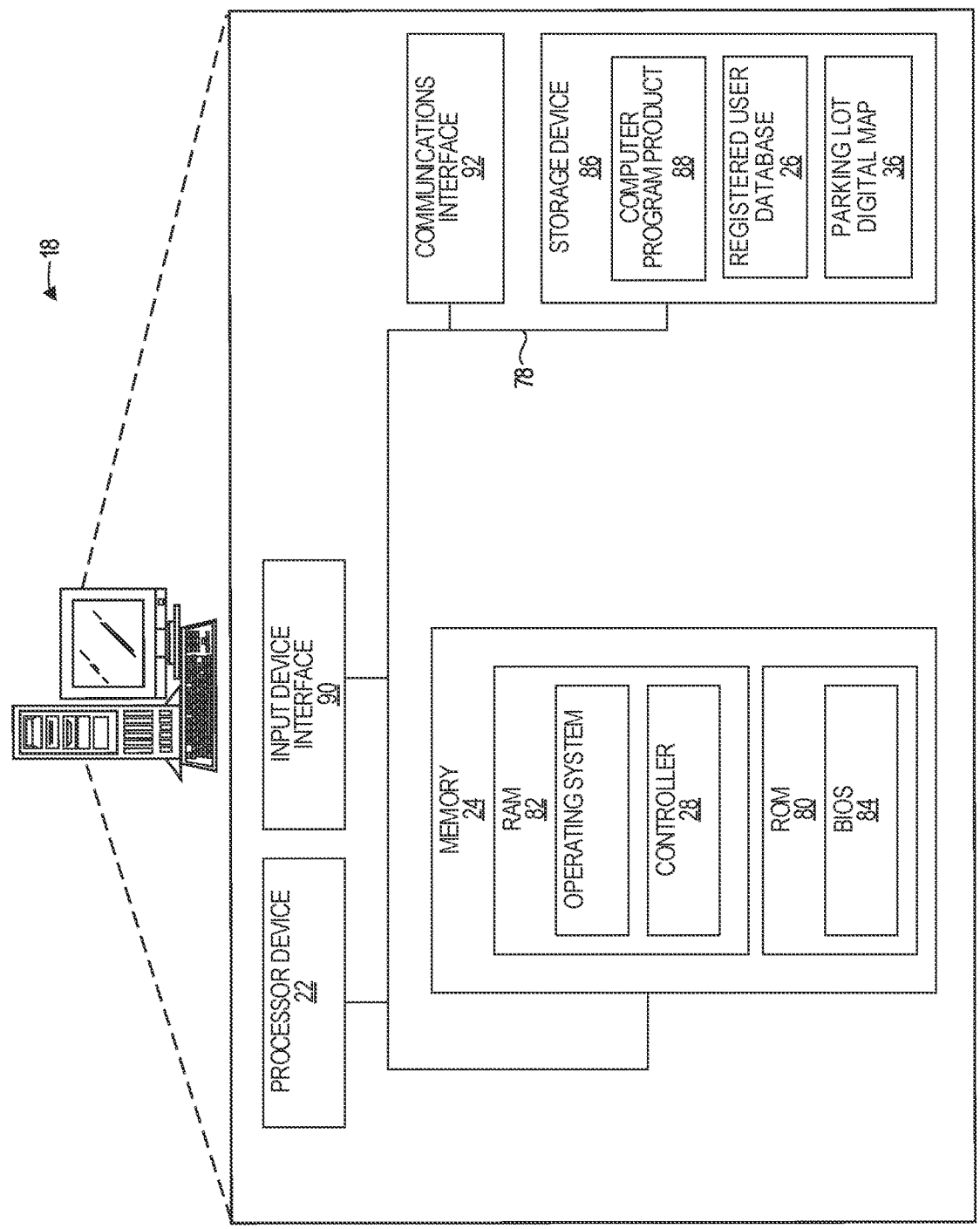
FIG. 7 is a block diagram of a computing device suitable for implementing embodiments disclosed herein.

FIG. 7 is a block diagram of the computing device 18 suitable for implementing examples according to one example. The computing device 18 may comprise any computing or electronic device capable of including firmware, hardware, and/or executing software instructions to implement the functionality described herein, such as a computer server, a desktop computing device, a laptop computing device, or the like. The computing device 18 includes the processor device 22, the system memory 24, and a system bus 78. The system bus 78 provides an interface for system components including, but not limited to, the system memory 24 and the processor device 22.

The system bus 78 may be any of several types of bus structures that may further interconnect to a memory bus (with or without a memory controller), a peripheral bus, and/or a local bus using any of a variety of commercially available bus architectures. The system memory 24 may include non-volatile memory 80 (e.g., read-only memory (ROM), erasable programmable read-only memory (EPROM), electrically erasable programmable read-only memory (EEPROM), etc.), and volatile memory 82 (e.g., random-access memory (RAM)). A basic input/output system (BIOS) 84 may be stored in the non-volatile memory 80 and can include the basic routines that help to transfer information between elements within the computing device 18. The volatile memory 82 may also include a high-speed RAM, such as static RAM, for caching data.

The computing device 18 may further include or be coupled to a non-transitory computer-readable storage medium such as the storage device 86, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 86 and other drives associated with computer-readable media and computer-usable media may provide non-volatile storage of data, data structures, computer-executable instructions, and the like.

A number of modules can be stored in the storage device 86 and in the volatile memory 82, including an operating system and one or more program modules, such as the controller 28, which may implement the functionality described herein in whole or in part.

All or a portion of the examples may be implemented as a computer program product 88 stored on a transitory or non-transitory computer-usable or computer-readable storage medium, such as the storage device 86, which includes complex programming instructions, such as complex computer-readable program code, to cause the processor device 22 to carry out the steps described herein. Thus, the computer-readable program code can comprise software instructions for implementing the functionality of the examples described herein when executed on the processor device 22. The processor device 22, in conjunction with the controller 28 in the volatile memory 82, may serve as a controller, or control system, for the computing device 18 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 22 through an input device interface 90 that is coupled to the system bus 78 but can be connected by other interfaces such as a parallel port, an Institute of Electrical and Electronic Engineers (IEEE) 1394 serial port, a Universal Serial Bus (USB) port, an IR interface, and the like. The computing device 18 may also include a communications interface 92, such as an Ethernet transceiver, suitable for communicating with the network(s) 20 as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a computing device from a video camera, imagery of a parking lot, the imagery depicting lines that define a plurality of parking spots;
   generating, by the computing device based on the imagery, a parking lot digital map comprising data that defines a location and dimensions of each parking spot;
   storing the parking lot digital map in a memory;
   receiving, by the computing device from the video camera, additional imagery of the parking lot;
   analyzing the additional imagery;
   determining that an orientation of the video camera differs from an original orientation of the video camera at a time the imagery of the parking lot was received;
   generating a new parking lot digital map based on the additional imagery; and
   replacing the parking lot digital map with the new parking lot digital map.

2. The method of claim 1 wherein generating the parking lot digital map comprising the data that defines the location and dimensions of each parking spot further comprises generating a plurality of geofence structures, each geofence structure corresponding to one of the plurality of parking spots and identifying a polygon that corresponds to the dimensions of the corresponding parking spot.

3. The method of claim 1 wherein receiving, from the video camera, the imagery of the parking lot further comprises receiving, from a plurality of video cameras, a corresponding plurality of images of the parking lot, each image of the plurality of images depicting a different portion of the parking lot and depicting lines that define a subset of the plurality of parking spots, and further comprising:
   merging the plurality of images into a merged image that depicts an entire parking lot; and
   wherein generating, based on the imagery, the parking lot digital map comprises generating, based on the merged image, the parking lot digital map comprising the data that defines the location and the dimensions of each parking spot of the plurality of parking spots.

4. The method of claim 1 further comprising:
   maintaining, by the computing device, an availability structure that identifies a set of parking spots that are available;
   generating, based on the parking lot digital map and the availability structure, an availability map that contains information that identifies the set of the parking spots; and
   sending, to a vehicle, the availability map.

5. The method of claim 1 further comprising:
   receiving, by the computing device from the video camera, additional imagery of the parking lot, the additional imagery depicting a vehicle;
   detecting, in the additional imagery, a license plate number of the vehicle;
   determining, based on a registered user database, that the license plate number is associated with a user; and
   initiating a parking charge to the user.

6. The method of claim 1 further comprising:
   receiving, by a vehicle, dimensions and location information that correspond to at least one parking spot for presentation on a display device within the vehicle;
   presenting, on the display device, video imagery depicting an environment in front of the vehicle; and
   overlaying, on the video imagery depicting the environment in front of the vehicle, parking spot lines of the at least one parking spot based on the parking lot digital map.

7. The method of claim 1 further comprising:
   receiving, by the computing device from the video camera, additional imagery of the parking lot, the additional imagery depicting a vehicle;
   detecting, in the additional imagery, a license plate number of the vehicle;
   determining, based on a registered user database, that the license plate number is associated with a user;
   determining that an event has occurred; and
   sending, to a destination address associated with the user, a message identifying the event.

8. The method of claim 7 further comprising sending, to the destination address associated with the user, a selectable link that, when selected, causes a live video stream generated by the video camera to be streamed to a computing device from which the link is selected.

9. A system comprising:
   one or more computing devices, each computing device comprising one or more processors, the one or more processors configured to:
   receive, from a video camera, imagery of a parking lot, the imagery depicting lines that define a plurality of parking spots;
   generate, based on the imagery, a parking lot digital map comprising data that defines a location and dimensions of each parking spot;
   store the parking lot digital map in a memory;
   receive, from the video camera, additional imagery of the parking lot;
   analyze the additional imagery;
   determine that an orientation of the video camera differs from an original orientation of the video camera at a time the imagery of the parking lot was received;
   generate a new parking lot digital map based on the additional imagery; and
   replace the parking lot digital map with the new parking lot digital map.

10. The system of claim 9 wherein to generate the parking lot digital map comprising the data that defines the location and dimensions of each parking spot, the one or more processors are further configured to generate a plurality of geofence structures, each geofence structure corresponding to one of the plurality of parking spots and identifying a polygon that corresponds to the dimensions of the corresponding parking spot.

11. A method comprising:
   receiving, by a computing device from a video camera, imagery of a parking lot, the imagery depicting lines that define a plurality of parking spots;
   generating, by the computing device based on the imagery, a parking lot digital map comprising data that defines a location and dimensions of each parking spot;
   storing the parking lot digital map in a memory;
   receiving, by the computing device from the video camera, additional imagery of the parking lot, the additional imagery depicting a moving vehicle;

determining, based on the additional imagery, that the vehicle is entering a parking spot;

determining that a portion of the vehicle is outside of a desired parking area associated with the parking spot; and sending a control signal to an indicator positioned in proximity to the parking spot that instructs the indicator to emit a visual indicator indicating that the vehicle is outside of the desired parking area.

12. The method of claim 11 wherein determining that the portion of the vehicle is outside of the desired parking area associated with the parking spot comprises:

determining a vehicle boundary box that surrounds the vehicle;

comparing the vehicle boundary box to the desired parking area associated with parking spot; and determining that a portion of the vehicle boundary box is outside of the desired parking area associated with parking spot.

13. A method comprising:

receiving, by a computing device from a video camera, imagery of a parking lot, the imagery depicting lines that define a plurality of parking spots;

generating, by the computing device based on the imagery, a parking lot digital map comprising data that defines a location and dimensions of each parking spot;

storing the parking lot digital map in a memory;

receiving, by the computing device from the video camera, additional imagery of the parking lot, the additional imagery depicting a moving vehicle;

determining, based on the additional imagery and the parking lot digital map, that the vehicle is entering a parking spot;

determining that a portion of the vehicle is outside of a desired parking area associated with the parking spot; and sending a message to the vehicle that indicates the vehicle is outside of the desired parking area and will be invoiced for two parking spots.

14. A method comprising:

receiving, by a computing device from a video camera, imagery of a parking lot, the imagery depicting lines that define a plurality of parking spots;

generating, by the computing device based on the imagery, a parking lot digital map comprising data that defines a location and dimensions of each parking spot;

storing the parking lot digital map in a memory;

determining that a vehicle is to park in the parking lot;

sending, by the computing device to the vehicle, based on the parking lot digital map, dimensions and location information that corresponds to at least one parking spot for presentation on a display device within the vehicle;

in response to determining that the vehicle is to park in the parking lot, sending a wireless communication to the vehicle; and receiving a wireless communication from the vehicle that indicates the vehicle can receive the dimensions and the location information that corresponds to the at least one parking spot for presentation on the display device within the vehicle.

15. A system comprising:

one or more computing devices, each computing device comprising one or more processors, the one or more processors configured to:

receive, from a video camera, imagery of a parking lot, the imagery depicting lines that define a plurality of parking spots;

generate, based on the imagery, a parking lot digital map comprising data that defines a location and dimensions of each parking spot;

store the parking lot digital map in a memory;

receive, from the video camera, additional imagery of the parking lot, the additional imagery depicting a moving vehicle;

determine, based on the additional imagery, that the vehicle is entering a parking spot;

determine that a portion of the vehicle is outside of a desired parking area associated with the parking spot; and send a control signal to an indicator positioned in proximity to the parking spot that instructs the indicator to emit a visual indicator indicating that the vehicle is outside of the desired parking area.

16. A system comprising:

one or more computing devices, each computing device comprising one or more processors, the one or more processors configured to:

receive, from a video camera, imagery of a parking lot, the imagery depicting lines that define a plurality of parking spots;

generate, based on the imagery, a parking lot digital map comprising data that defines a location and dimensions of each parking spot;

store the parking lot digital map in a memory;

receive, from the video camera, additional imagery of the parking lot, the additional imagery depicting a moving vehicle;

determine, based on the additional imagery and the parking lot digital map, that the vehicle is entering a parking spot;

determine that a portion of the vehicle is outside of a desired parking area associated with the parking spot; and send a message to the vehicle that indicates the vehicle is outside of the desired parking area and will be invoiced for two parking spots.

17. A system comprising:

one or more computing devices, each computing device comprising one or more processors, the one or more processors configured to:

receive, from a video camera, imagery of a parking lot, the imagery depicting lines that define a plurality of parking spots;

generate, based on the imagery, a parking lot digital map comprising data that defines a location and dimensions of each parking spot;

store the parking lot digital map in a memory;

determine that a vehicle is to park in the parking lot;

send, to the vehicle, based on the parking lot digital map, dimensions and location information that corresponds to at least one parking spot for presentation on a display device within the vehicle;

in response to determining that the vehicle is to park in the parking lot, send a wireless communication to the vehicle; and receive a wireless communication from the vehicle that indicates the vehicle can receive the dimensions and the location information that corresponds to the at least one parking spot for presentation on the display device within the vehicle.

* * * * *